INVENTORS
W. N. DOGGETT
D. A. SUPPES

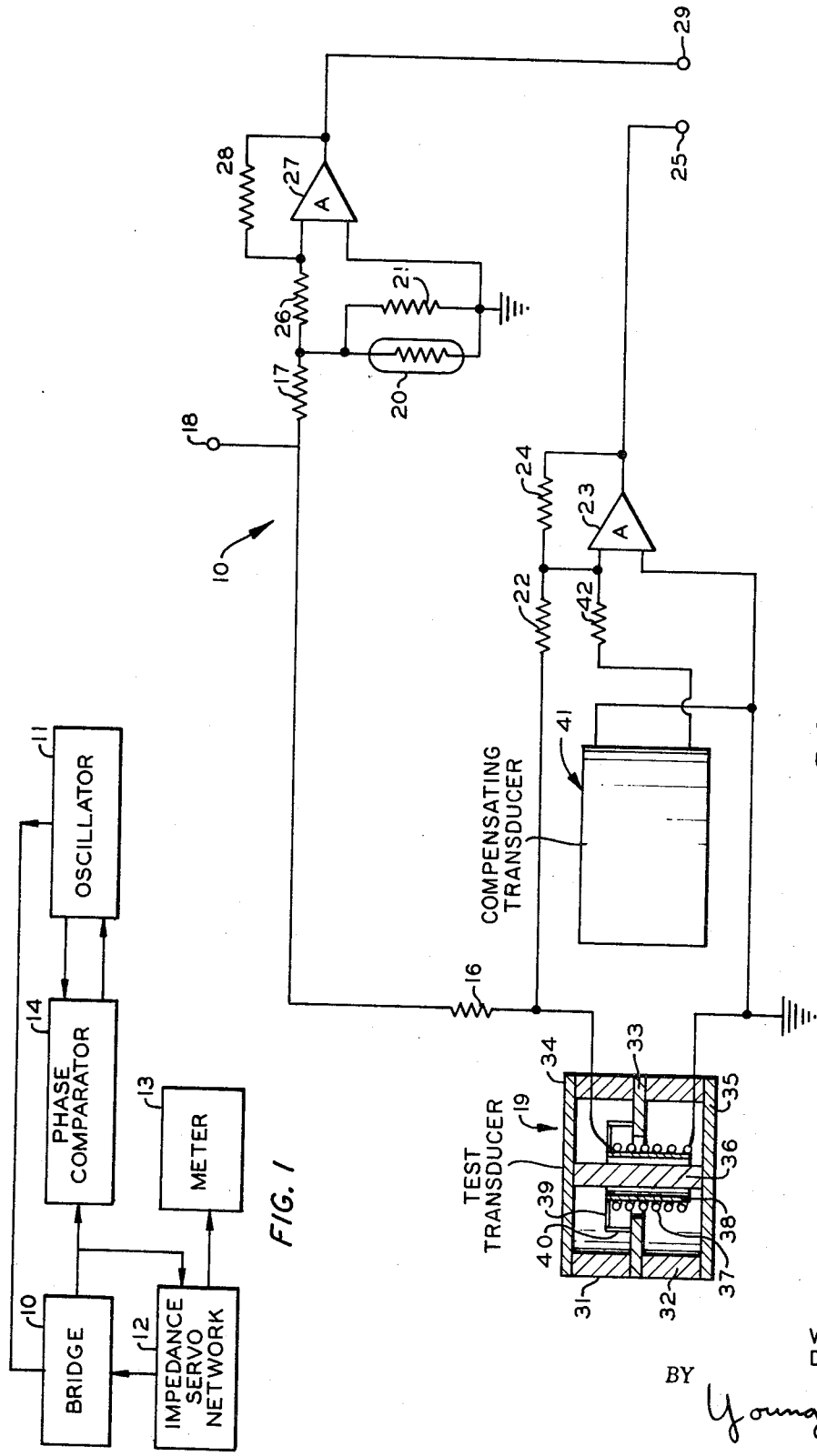

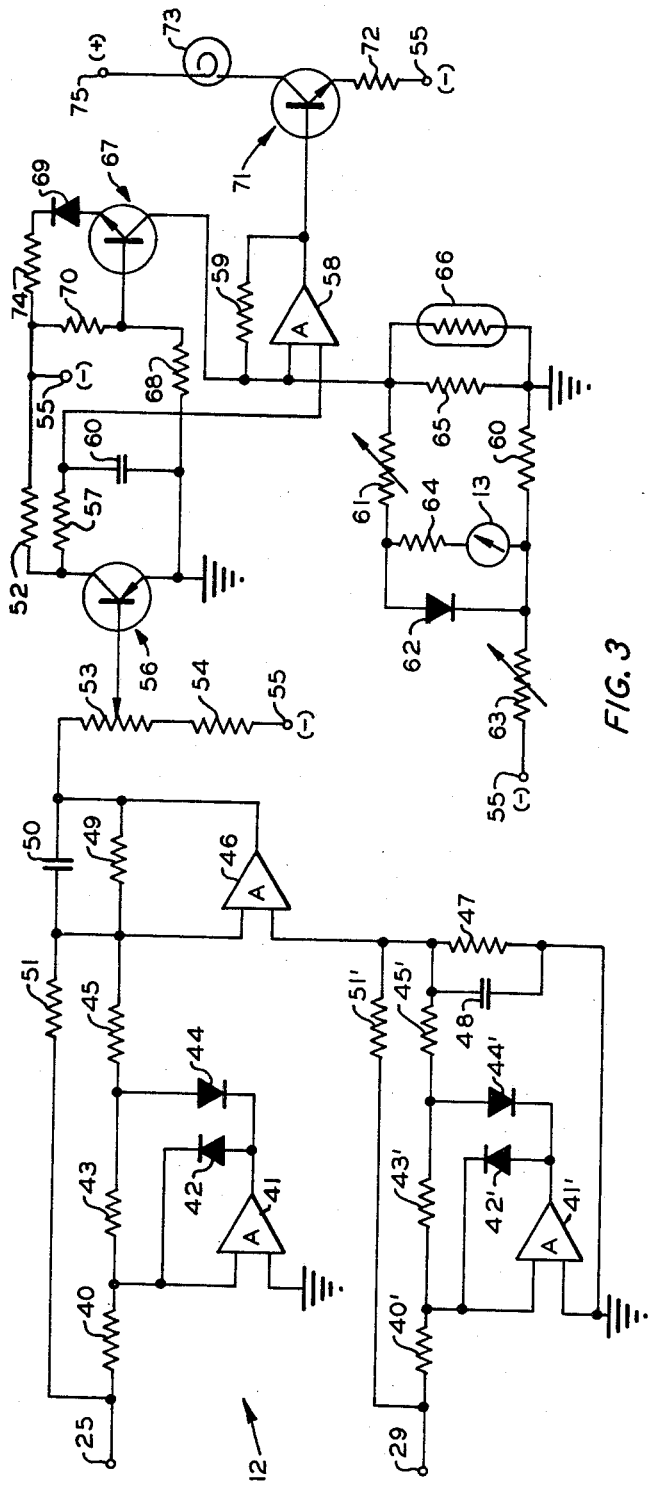
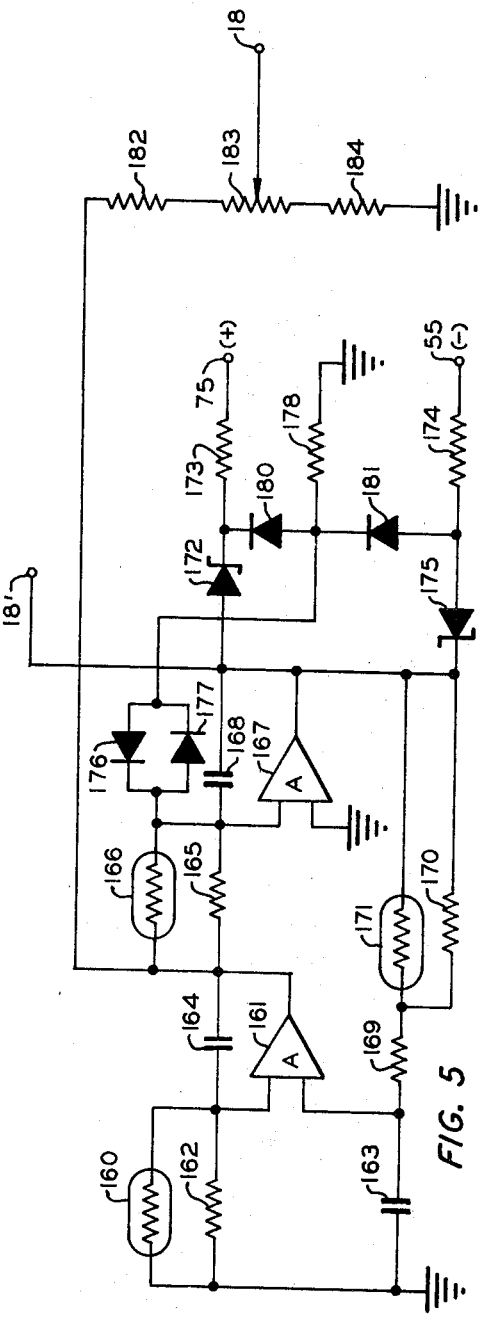
FIG. 3
FIG. 5
INVENTORS
W.N. DOGGETT
D.A. SUPPES
BY Young & Quigg
ATTORNEYS

BY

ATTORNEYS

United States Patent Office 3,522,529
Patented Aug. 4, 1970

3,522,529
IMPEDANCE MEASURING ALTERNATING CURRENT BRIDGE HAVING AN AUTOMATICALLY ADJUSTABLE FREQUENCY OSCILLATOR
William N. Doggett and Duane A. Suppes, Bartlesville, Okla., assignors to Phillips Petroleum Company, a corporation of Delaware
Filed Dec. 14, 1967, Ser. No. 690,545
Int. Cl. G01r 29/22; H01j 39/12
U.S. Cl. 324—57                                             6 Claims

ABSTRACT OF THE DISCLOSURE

Impedance elements, such as geophones, are tested by means of an alternating current bridge circuit. The applied potential is maintained at the natural resonance frequency of the element being tested by means of a phase comparison servo system. An impedance servo system is provide to rebalance the bridge. Both servo systems can utilize radiation sources and radiation sensitive elements.

---

Figure 4A:
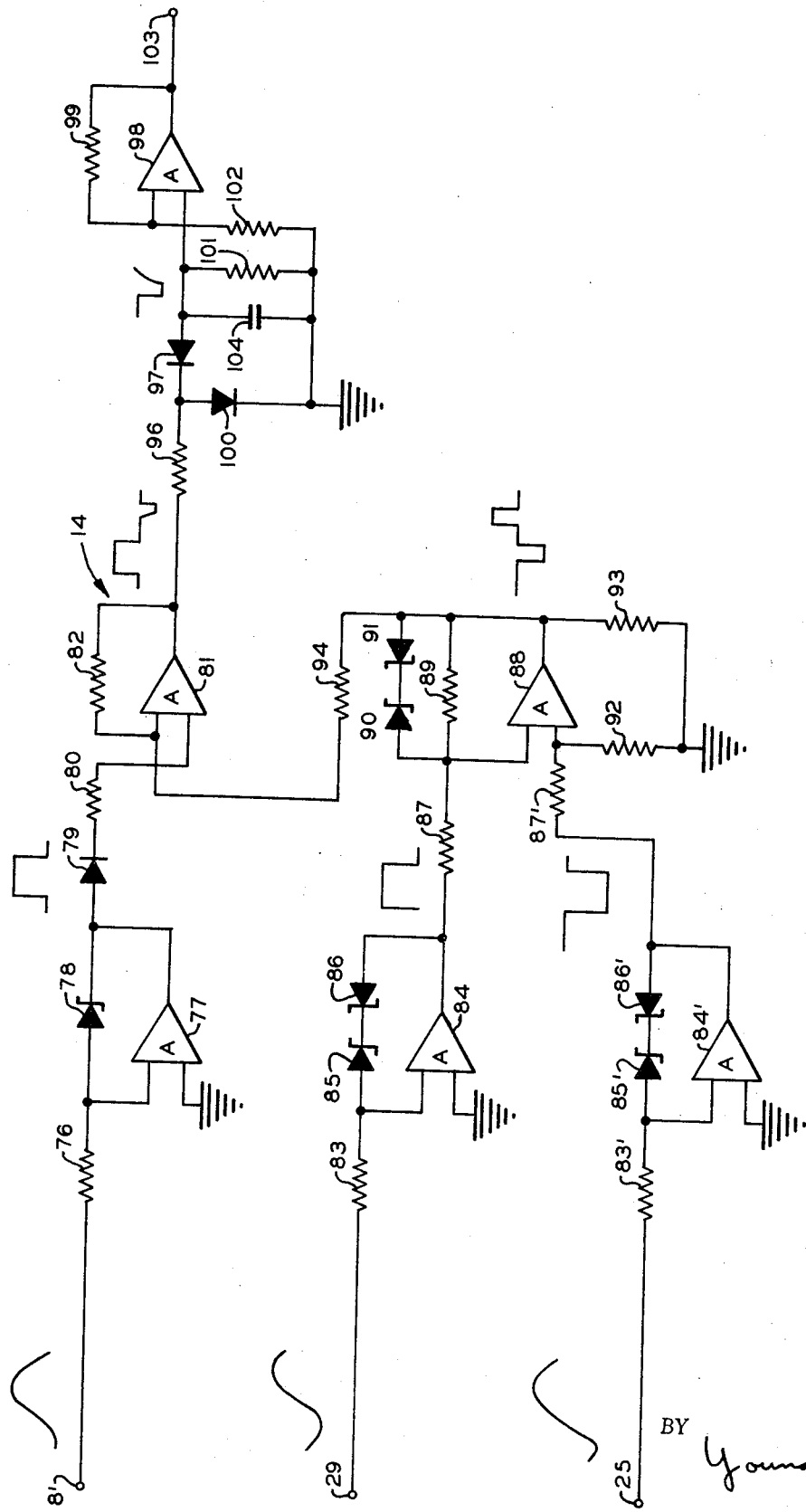

This invention relates to the testing of impedance elements.

It is common practice in the geophysical industry to map subterranean strata by imparting vibrations to the earth and measuring the vibrations which are reflected back to the surface. The vibrations are measured by the use of geophones which are spaced along the surface of the earth with respect to the shot point. These geophones are usually transducing elements which convert mechanical vibrations into corresponding electrical signals. A common type of geophone is one in which a movable coil is mounted by suitable springs in a magnetic field, the latter being established by one or more permanent magnets which are rigidly mounted in the geophone housing. When the geophone is subjected to vibrations, the coil tends to move relative to the magnetic field so that an electrical signal is generated across the end terminals of the coil.

Because geophones of this type are employed in large numbers and are often of relatively inexpensive construction, it is desirable to have a method of testing the geophones to determine if they are in proper operating condition. In particular, it is important to determine if the coils are free to vibrate relative to the geophone housings. It is also desirable to have a means for determining if the geophones are positioned properly in the field to receive vibrations.

In accordance with the present invention, apparatus is provided which is capable of testing geophones and other similar transducing elements to determine if the elements are in proper operating condition. This apparatus comprises a bridge network which is adapted to have a test instrument positioned in one arm thereof. An alternating electrical signal is applied across two opposite terminals of the bridge. The voltages at the second pair of bridge terminals are compared by a circuit which includes means to amplify each of the voltages and means to rectify the resulting amplified signals. The two rectified signals are compared to provide an indication of the impedance of the test instrument. A measurement of the impedance of transducers of the type described can be used to provide an indication of the freedom of the coil to move in the magnetic field because the impedance of such an element is entirely resistive when the transducer is energized at its natural resonance frequency. Circuit means are also provided in accordance with this invention for adjusting the frequency of the alternate potential applied across the bridge so as to maintain this frequency at the resonance value of the test instrument.

Accordingly, it is an object of this invention to provide novel apparatus for measuring the impedance of transducing elements.

Another object is to provide apparatus which is capable of testing one or more geophones to determine if the geophones are in proper operating condition.

Figure 4B:
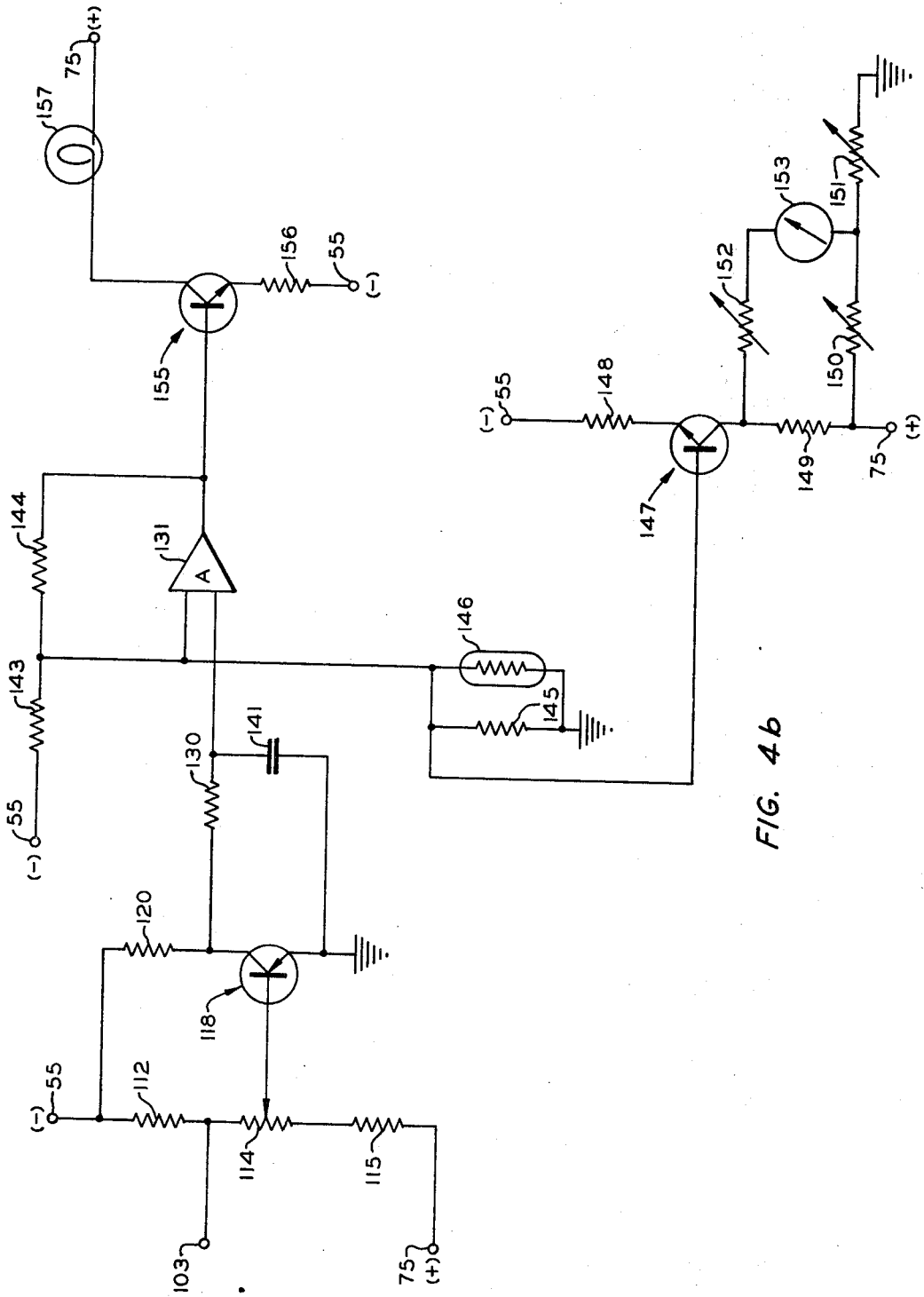

Other objects, advantages and features of the invention should become apparent from the following detail description in conjunction with the accompanying drawing in which:

FIG. 1 is a schematic representation of the principal components of the test circuit of this invention. FIG. 2 is a circuit drawing of the bridge circuit of FIG. 1. FIG. 3 is a circuit drawing of the impedance servo network of FIG. 1. FIGS. 4a and 4b are circuit drawings of the phase comparator of FIG. 1. FIG. 5 is a circuit drawing of the oscillator of FIG. 1.

Referring now to the drawing in detail and to FIG. 1 in particular, there is shown a bridge network 10 which has the output of an oscillator 11 applied thereto. The output signal from the bridge network is applied to an impedance servo network 12 and to a phase comparator 14. Output signals from network 12 are applied to a meter 13 and to bridge network 10, the latter signal effecting a balancing of the bridge. An output signal from phase comparator 14 adjusts the frequency of oscillator 11, and an output signal from oscillator 11 is fed back to the phase comparator.

Bridge network 10 is illustrated in detail in FIG. 2. Resistors 16 and 17 form respective first and second arms of the bridge. The first terminals of these resistors are connected to an input terminal 18 which receives a signal from oscillator 11 of FIG. 1. A transducing element 19 to be tested forms the thrid arm of the bridge. This element is connected between resistor 16 and ground. Resistors 20 and 21 are connected in parallel with one another between resistor 17 and ground to form the fourth arm of the bridge. As will be described hereinafter in greater detail, resistor 20 is radiation sensitive such that its resistance is a function of the amount of radiation impinging thereon from a source in network 12. The junction between resistor 16 and element 19 is connected by a resistor 22 to the first input terminal of an operational amplifier 23, the latter having a feed back resistor 24. The second input of amplifier 23 is connected to ground. The output of amplifier 23 is connected to a first output terminal 25. The junction between resistors 17 and 20 is connected by a resistor 26 to the first input terminal of a second operational amplifier 27, the latter having a feed back resistor 28. The second input terminal of amplifier 27 is connected to ground. The output of amplifier 27 is connected to a second output terminal 29.

A typical transducer of the type to be tested in accordance with this invention is illustrated schematically in FIG. 2. A permanent magnetic field is established by two annular magnets 31 and 32 which are separated by an annular pole piece 33. Circular members 34 and 35 of magnetic material extend across the ends of the magnets, and a central pole piece 36 extends between elements 34 and 35. The space between pole pieces 33 and 36 forms an annular air gap in which is suspended a coil 37. Coil 37 is mounted on a sleeve 38 of non-magnetic material, and is suspended by an annular spring 39 which is positioned by a suitable support 40. In this manner, coil 37 is free to move in a vertical plane with respect to the magnet and pole piece structure which forms the transducer housing. This transducer can be employed to detect vibrations when it is positioned on a surface to be tested. The housing vibrates with the surface, but the coil tends to remain stationary due to its inertia. Movement of the coil relative to the magnetic field generates an electrical signal. Coil 37 forms one arm of the bridge network.

A second transducer 41, which can be identical to transducer 13, is employed in the circuit of FIG. 2 in order to compensate for any extraneous noise signal which may be generated within the transducer being tested. One terminal of transducer 41 is connected to ground, and the second terminal is connected by a resistor 42 to the first input of amplifier 23. Transducer 41 is connected to amplifier 23 so that its polarity is opposite that of transducer 19 with the result that any corresponding noise vibrations tend to canceal one another. Although transducer element 41 is not essential to the operation of the test circuit, it does serve a useful purpose in many applications.

Resistors 16 and 17 have relatively large values so that substantially constant currents flow through coil 37 and resistors 20 and 21. When the bridge is in a condition of balance, the potentials of terminals 25 and 29 are equal. Any unbalance of the bridge results in a potential difference between these terminals, which difference is measured by network 12 and meter 13.

As illustrated in FIG. 3, terminal 25 is connected by a resistor 40 to the first input of an operational amplifier 41. The second input of amplifier 41 is connected to ground. A first diode 42 is connected between the output and the first input of amplifier 41. A resistor 43 and a second diode 44 are connected in series between the first input and the output of amplifier 41. The junction between resistor 43 and diode 44 is connected by a resistor 45 to the first input of an operational amplifier 46, the second input of which is connected to ground by a resistor 47 and a capacitor 48 which are connected in parallel relationship. Amplifier 46 is provided with a feed back resistor 49 and a capacitor 50 which are connected in parallel relationship. Terminal 25 is connected to the first input of amplifier 46 by a resistor 51. Terminal 29 is connected to the second input of amplifier 46 by a circuit which corresponds to that previosuly described with respect to terminal 25, and wherein corresponding elements are designated by like primed reference numerals.

The circuit thus far described in FIG. 3 amplifies the two output signals from the bridge network of FIG. 2. The amplified signals are rectified by full wave rectifiers, and substracted by amplifier 46.

The output of amplifier 46 is connected to the first end terminal of a potentiometer 53, the second end terminal of which is connected by a resistor 54 to a negative potential terminal 55 which is maintained at a negative potential. The contactor of potentiometer 53 is connected to the base of a transistor 56. The emitter of transistor 56 is connected to ground, and the collector is connected to a negative potential terminal 55 through a resistor 52. The collector of transistor 56 is also connected by a resistor 57 to the second input of an operational amplifier 58, which is provided with a feed back resistor 59. A capacitor 60 is connected between the second input of amplifier 58 and ground. The first input of amplifier 58 is connected by a variable resistor 61, a diode 62 and a variable resistor 63 to a negative potential terminal 55. A resistor 60 is connected between ground and the junction between elements 62 and 63. A resistor 64 and meter 13 are connected in series with one another in parallel with rectifier 62. Resistors 65 and 66 are connected in parallel with one another between the first input of amplifier 58 and ground. Resistor 66 is similar to resistor 20 of FIG. 2 in that it is radiation sensitive. The first input of amplifier 58 is connected to the collector of a transistor 67. The base of transistor 67 is connected by a resistor 68 to ground. A diode 69 and a resistor 74 are connected between the emitter of transistor 67 and a negative potential terminal 55. The base of the transistor is connected through a resistor 70 to a negative potential terminal 55. The output of amplifier 58 is connected to the base of a transistor 71. The emitter of transistor 71 is connected by a resistor 72 to a negative potential terminal 55. A lamp 73 is connected between the collector of transistor 71 and a terminal 75 which is maintained at a positive potential.

If the potential which appears at terminal 29 is greater than the potential at terminal 25, the output from amplifier 46 is a positive voltage which turns off conduction by transistor 56 so that capacitor 60 is permitted to charge through resistor 57, the latter having a very large value, such as ten megohms. Capacitor 60 can have a value such as four microfarads. The resulting voltage on capacitor 60 is applied to amplifier 58, the output of which regulates conduction by transistor 71, and thereby the amount of radiation provided by lamp 73. Lamp 73 is positioned with respect to resistor 20 of FIG. 2 such that radiation from the lamp strikes on the resistor. This provides a servo system wherein resistor 20 is adjusted by the current flow through lamp 73 to restore the bridge of FIG. 2 to a balanced condition. If the voltage at terminal 29 becomes larger than the voltage at terminal 25, for example, the current through lamp 73 decreases, which causes the resistance of element 20 to increase to restore a balanced condition. Transistor 67 serves as a constant current source such that the voltage at the first input of amplifier 58 varies linearly with impedance at this input of amplifier 58. The current flow is measured by meter 13 which can be a DC micro ammeter, thereby providing an indication of the impedance of the test element. Resistor 66 is also illuminated by lamp 73 so that its resistance varies as a function of the current through the lamp.

The foregoing operation of the bridge and servo system is based on the assumption that the frequency of the alternating potential applied across the bridge is the same as the natural resonance frequency of transducer 19. Under this condition, the impedance of coil 37 is solely a resistance. In view of the fact that individual transducers being tested will often have somewhat different resonance frequencies, it is necessary to provide means for adjusting the frequency of oscillator 11 to accommodate various test instruments. This can be accomplished by means of the circuit illustrated in FIGS. 4a and 4b.

The circuit of FIG. 4a is provided with three input terminals 18', 25 and 29. Terminal 18' is connected by a resistor 76 to the first input of an operation amplifier 77, the second input of which is connected to ground. A Zener diode 78 is connected between the first input and the output of amplifier 77. The output of amplifier 77 is connected by a diode 79 and a resistor 80 to the second input of an operational amplifier 81, which is provided with a feed back resistor 82. Input terminals 29 is connected by a resistor 83 to the first input of an operational amplifier 84, the second input of which is connected to ground. Zener diodes 85 and 86 are connected between the first input and the output of amplifier 84. The output of amplifier 84 is connected by a resistor 87 to the first input of an operational amplifier 88, which is provided with a feed back resistor 89. Zener diodes 90 and 91 are connected in parallel with resistor 89, Input terminal 25 is connected to the second input of amplifier 88 by means of a circuit which corresponds to that associated with terminal 25 and wherein corresponding elements are designated by like primed reference numerals. A resistor 92 is connected between the second input of amplifier 88 and ground, and a resistor 93 is connected between the output of amplifier 88 and ground. A resistor 94 is connected between the output of amplifier 88 and the first input of amplifier 81.

The output of amplifier 81 is connected by a resistor 96 and a diode 97 to the second input of an operational amplifier 98, which is provided with a feed back resistor 99. A diode 100 is connected between the junction between elements 96 and 97 and ground. A resistor 101 and a capacitor 104 are connected in parallel relationship between the second input of amplifier 98 and ground. A resistor 102 is connected between the first input of amplifier 98 and ground. The output of amplifier 98 is connected to a terminal 103.

The two input signals at terminals 29 and 25 of FIG. 4a are amplified by respective amplifiers 84 and 84', and converted into corresponding square wave signals which are subtracted by amplifier 88. If the two input signals are out of phase, as illustrated by the wave forms, the resulting square waves will have the general configurations shown. The input signal at terminal 18', which is obtained from oscillator 11, is 90° out of phase with the signal applied to terminal 18 of FIG. 2. The signal at terminal 18' is amplified and converted to a square wave which is positive at all times. Amplifier 81 subtracts the output from amplifier 88 from the output from amplifier 77. If the resulting output signal from amplifier 81 contains a negative component, as illustrated, this in indicative of the fact that the voltage at terminal 25 lags the voltage at terminal 29. The frequency of oscillator 11 must then be increased to compensate for this situation. The circuit of FIG. 4a is employed to control the frequency of oscillator 11 to perform the necessity adjustment.

Terminal 103 of FIG. 4b is connected by a resistor 112 to a negative potential terminal 55. Terminal 103 is also connected to the first end terminal of potentiometer 114, the second terminal of which is connected by a resistor 115 to a positive potential terminal 75. The contactor of potentiometer 114 is connected to the base of transistor 118. The emitter of transistor 118 is connected to ground. The collector of transistor 118 is connected by a resistor 120 to terminal 55. The collector of transistor 118 is also connected through a resistor 130 to the second input of an amplifier 131. A capacitor 141 is connected between the second input of amplifier 131 and ground.

The circuit thus far described in FIG. 4b performs a logic function with respect to the charge on capacitor 141. This is illustrated in the following table:

| Voltage at terminal 103: | Capacitor 141 |
|---|---|
| Negative | Charge. |
| Zero | Discharge. |

As illustrated in this table, the circuit of FIG. 4b serves to charge and discharge capacitor 141 in accordance with the two input signals. The voltage on this capacitor is the input to amplifier 131, the output of which serves to adjust the frequency of oscillator 11 in the manner to be described.

The first input of amplifier 131 is connected by a resistor 143 to a negative potential terminal 55. Amplifier 131 is provided with a feed back resistor 144. The first input of amplifier 131 is connected to ground by parallel connected resistors 145 and 146, the latter being radiation sensitive. The first input of amplifier 131 is also connected to the base of a transistor 147. The emitter of transistor 147 is connected by a resistor 148 to a negative potential terminal 55. The collector of transistor 147 is connected by a resistor 149 to a terminal positive potential 75. Series connected adjustable resistors 150 and 151 are connected between terminal 75 and ground. A variable resistor 152 and a current meter 153 are connected between the collector of transistor 147 and the junction between resistors 150 and 151. The output of amplifier 131 is connected to the base of a transistor 155. The emitter of transistor 155 is connected by a resistor 156 to a negative potential terminal 55. A lamp 157 is connected between the collector of transistor 155 and a positive potential terminal 75. Lamp 157 is positioned to illuminate resistor 146 and thereby control the resistance of this resistor. Lamp 157 also illuminates a radiation sensitive resistor in the oscillator circuit to be described.

Oscillator 11 is illustrated in FIG. 5. A radiation sensitive resistor 160, which receives radiation from lamp 157 of FIG. 4b, is connected between the first input of an operational amplifier 161 and ground. A resistor 162 is connected in parallel with resistor 160. A capacitor 163 is connected between the second input of amplifier 161 and ground. Amplifier 161 is provided with a feed back capacitor 164. The output of amplifier 161 is connected by parallel connected resistors 165 and 166 to the first input of an operational amplifier 167. Resistor 166 is radiation sensitive and is also illuminated by lamp 157 of FIG. 4b. The second input of amplifier 167 is connected to ground. Amplifier 167 is provided with a feed back capacitor 168. The output of amplifier 167 is connected to terminal 18' of the phase comparator of FIG. 4a. Resistors 170 and 171 are connected in series between the output of amplifier 167 and the second input of amplifier 161. A radiation sensitive resistor 171, which is illuminated by lamp 157 of FIG. 4b, is connected in parallel with resistor 170. The output of amplifier 167 is connected by a Zener diode 172 and a resistor 173 to a positive potential terminal 75. A resistor 174 and a Zener diode 175 are connected between a negative potential terminal 55 and the output of amplifier 167. The first input of amplifier 167 is connected by parallel connected diodes 176 and 177 and a resistor 178 to ground. A diode 180 is connected between resistors 178 and 173, and a diode 181 is connected between resistors 174 and 178. The output of amplifier 161 is also connected to ground by a resistor 182, a potentiometer 183 and a resistor 184 which are connected in series relationship. The contactor of potentiometer 183 is connected to terminal 18 which supplies the input signal to bridge 10 of FIG. 1.

The frequency F of oscillator 11 is given by the equation $$F = 1/2\pi RC$$

where R is approximately equal the product of the resistances of elements 160 and 162 divided by the sum of the resistances of elements 160 and 162, and C is the capacitance of element 163. Lamp 157 controls the radiation sensitive resistors in the oscillator such that the voltage at terminal 110 approaches zero. In the illustrated circuit, the various operational amplifiers can be of the type described in Bulletin T52/1B1, July 1967, Philbrick Researches, Inc., Dedham, Mass. In the drawing, the upper and lower input terminals are the negative and positive input terminals, respectively, of such amplifiers.

While this invention has been described in conjunction wtih a presently preferred embodiment, it obviously is not limited thereto.

What is claimed is:

1. Apparatus for use in testing impedance elements comprising:
   a bridge network having first and second input terminals, a first resistance element and a variable resistance element connected in series between said first and second terminals, the junction between said first resistance element and said variable resistance element constituting a first output terminal, a second output terminal, and a second resistance element connected between said first input terminal and said second output terminal, said network being adapted to have the element to be tested connected between said second output terminal and said second input terminal;
   a variable frequency oscillator to apply an alternating potential of predetermined frequency across said first and second input terminals;
   first rectifying means having its input connected to said first output terminal;
   second rectifying means having its input connected to said secnod output terminal;
   subtracting means having its two inputs connected to the outputs of said first and second rectifying means, respectively;
   means responsive to the output of said subtracting means to adjust said variable resistance element to reduce the output of said subtracting means to zero;
   means to measure the output of said subtracting means;
   phase comparison means having its two inputs connected to said first and second output terminals, respectively; and means responsive to the output of said phase comparing means to adjust the frequency of said oscillator.

2. The apparatus of claim 1 wherein said oscillator provides two output signals which are 90° out of phase with one another, and wherein said phase comparing means comprises first rectifying means connected to the output of said first output terminal, second rectifying means connected to the output of said second output terminal, third rectifying means adapted to have one of the output signals of said oscillator applied to the input thereof, first means to subtract the output of said second rectifying means from the output of said first rectifying means, second means to subtract the output of said first subtracting means from the output of said third rectifying means, means to compare the outputs of said first and second means to subtract, and means responsive to said means to compare to adjust the frequency of said oscillator.

3. The apparatus of claim 2 wherein said oscillator has a radiation sensitive resistance element therein, the resistance of which is a function of radiation impinging thereon, the frequency of said oscillator being a function of the resistance of said radiation sensitive resistance element, and wherein said means to adjust comprises a radiation source positioned to irradiate said radiation sensitive resistance element, and means to control said radiation source in response to the output of said means to compare.

4. The apparatus of claim 1, further comprising an impedance element to be tested, said impedance element comprising a housing adapted to be subjected to vibrations, means carried by said housing to establish a magnetic field across an air gap, and a coil suspended within said air gap so that vibration of said housing tends to move said housing relative to said coil; and means connecting said coil in said bridge circuit between said second output terminal and said second input terminal.

5. The apparatus of claim 4, further comprising a second impedance element of construction corresponding to said impedance element to be tested, and means connecting the coil of said second impedance element in parallel with the coil of said impedance element to be tested, but of opposite polarity, so that any noise signals generated by the two impedance elements oppose one another.

6. The apparatus of claim 1 wherein said variable resistance element is formed at least in part by a radiation sensitive resistance element, the resistance of which varies in accordance with the amount of radiation impinging thereon, and wherein said means to adjust comprises a radiation source positioned to irradiate said radiation sensitive resistance element, said radiation source being actuated in accordance with the output of said subtracting means.

References Cited

UNITED STATES PATENTS

| | | | |
|---|---|---|---|
| 2,648,979 | 8/1953 | Cornett | 73—67 |
| 2,857,757 | 10/1958 | Kendig et al. | 73—67.2 |
| 2,950,437 | 8/1960 | Stahl | 324—57 X |
| 2,968,180 | 1/1961 | Schafer | 324—61 X |
| 3,155,902 | 3/1964 | Walls | 324—61 |
| 3,244,977 | 4/1966 | Folsom | 324—57 |
| 3,315,153 | 4/1967 | Whatley | 250—210 X |
| 3,378,788 | 4/1968 | Barber | 331—66 |
| 3,427,458 | 2/1969 | Parfomak et al. | 250—205 |

OTHER REFERENCES

Graham, J. F.: Automatic A.C. Bridges, in Electronics, February 1951. Pp. 110–116. TK 7800 E58.

EDWARD E. KUBASIEWICZ, Primary Examiner

U.S. Cl. X.R.

250—210; 331—66